United States Patent [19]

DeMars

[11] Patent Number: 5,673,608
[45] Date of Patent: Oct. 7, 1997

[54] TOASTER MOUNTED FOOD CUTTING HOLDER

[76] Inventor: Robert A. DeMars, 5000 N. Parkway Calabasas, Ste. 233, Calabasas, Calif. 91302

[21] Appl. No.: 728,453

[22] Filed: Oct. 15, 1996

[51] Int. Cl.⁶ ............................................. A47J 37/08
[52] U.S. Cl. .................. 99/329 RT; 83/454; 83/762; 99/357; 99/385; 99/389; 99/537; 269/87.2
[58] Field of Search ........................... 99/326–331, 339, 99/340, 357, 385, 537, 484; 83/762, 862, 866, 870, 874, 886, 454, 459, 462, 465; 219/492, 521; 269/87.2, 236, 238, 295; 225/94, 97; D7/673

[56] References Cited

U.S. PATENT DOCUMENTS

| | | | |
|---|---|---|---|
| 3,670,642 | 6/1972 | Bergman | 99/329 RT |
| 3,824,915 | 7/1974 | Capucio | 99/329 RT |
| 4,261,257 | 4/1981 | Henderson et al. | 99/386 |
| 4,454,803 | 6/1984 | Wolf et al. | 99/329 RT |
| 4,530,276 | 7/1985 | Miller | 99/386 |
| 4,651,634 | 3/1987 | Barton | 99/332 |
| 4,791,862 | 12/1988 | Hoffmann | 99/385 |
| 4,807,862 | 2/1989 | Popeil et al. | 269/87.2 |
| 4,948,106 | 8/1990 | Popeil et al. | 83/762 X |
| 5,228,668 | 7/1993 | Guyer | 269/87.2 |
| 5,361,666 | 11/1994 | Kensrue | 83/454 X |
| 5,481,953 | 1/1996 | McLeod | 83/762 |
| 5,611,266 | 3/1997 | Kensrue | 99/537 |

Primary Examiner—Timothy F. Simone
Attorney, Agent, or Firm—Jack C. Munro

[57] ABSTRACT

A food cutting holder mounted in conjunction with a toaster for toasting bagels, muffins, bread slices and other similar types of foodstuff. The food cutting holder is to be confinable within the housing of the toaster when in the storage position and removable from the housing when it is intended to be used. The food cutting holder confiningly locates the food item in a precise position facilitating division of the food item into a plurality of separate pieces. It is intended that these separate pieces are then to be toasted within the toaster.

10 Claims, 3 Drawing Sheets

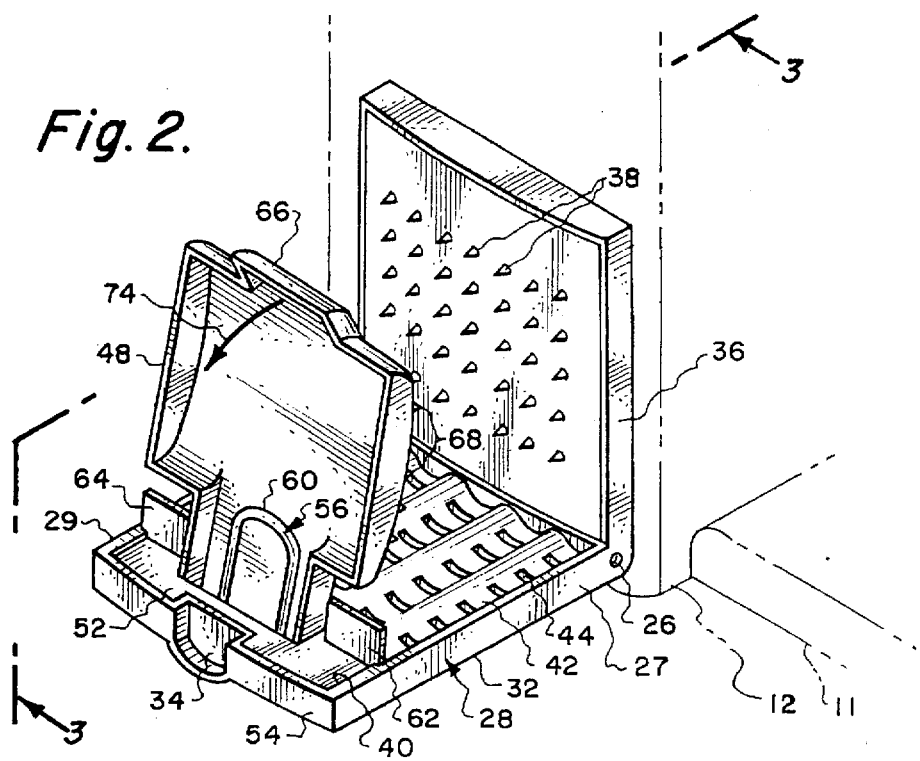
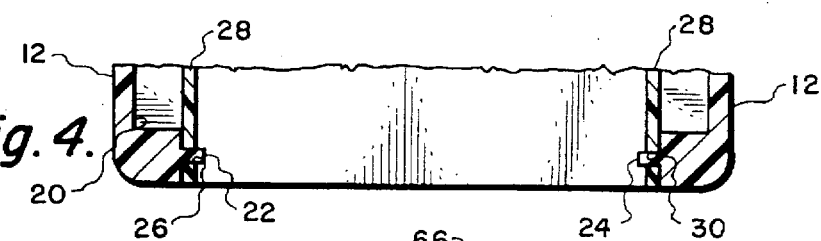
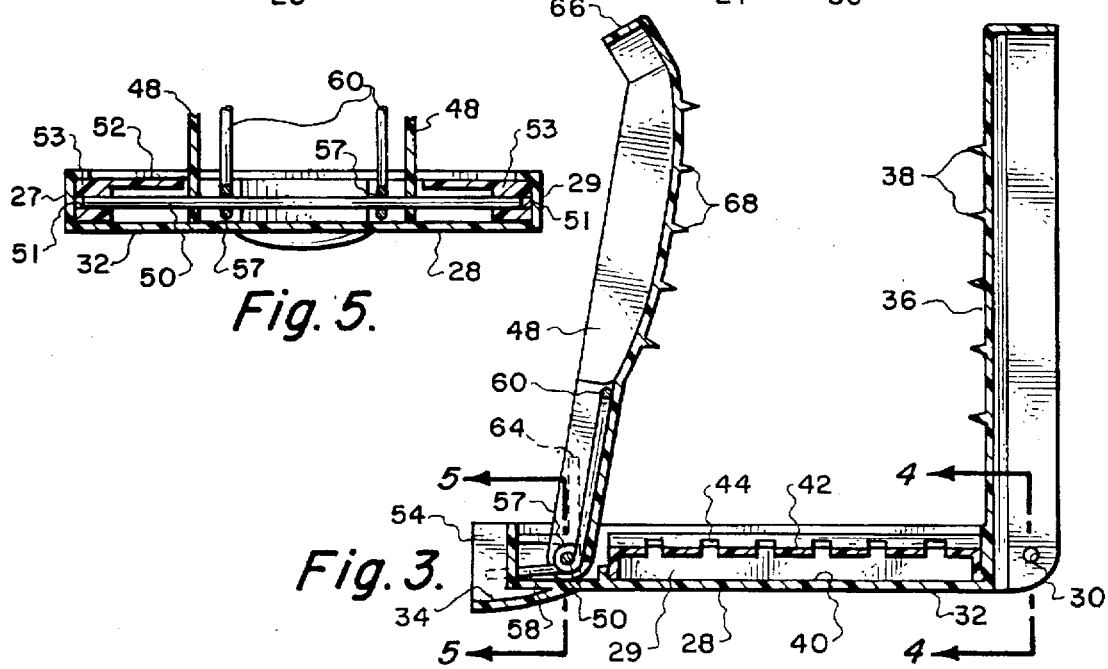

TOASTER MOUNTED FOOD CUTTING HOLDER

BACKGROUND OF THE INVENTION

1) Field of the Invention

The field of this invention relates to toasters and more particularly to a toaster that includes a food cutting holder that is designed to be used by a human user to facilitate sectioning of a food item, such as a bagel, in order to facilitate toasting of the item within the toaster.

2) Description of the Prior Art

In the past, there have been numerous designs for toasters, the most common form of toaster being for slices of bread. Such toasters can also be used to toast bagels and muffins. It is generally necessary for the user to slice the bagels and muffins into two or three pieces prior to being toasted since such are too wide for the opening in the top of the toaster. The resulting pieces are to have a width which will be less than the opening that is provided within the toaster. The conventional slicing procedure for a bagel requires the user to place the bagel on its circumferential edge in an upright manner and be held by the hand of the user. The user then directs a knife blade longitudinally through the bagel attempting to divide the bagel into two relatively equal halves. This type of cutting procedure is difficult for many people and has resulted in a large number of hand cuts. Additionally, some people prefer to cut the bagel into three pieces as opposed to two which produces narrower separate pieces which not only facilitate the toasting procedure but also produces a more toasted end food product. The dividing of a bagel into thirds by this hand technique causes the user to be even more prone to injury. There is a need to incorporate a simplified and safe form of holder device in conjunction with a conventional toaster that can be used by the user to slice a bagel or muffin into a plurality of separate pieces with the slicing procedure to be accomplished in a safe manner.

The present inventor has been assigned U.S. Pat. No. 5,522,306, issued Jun. 4, 1996, entitled TOASTER AND CUTTER. The subject matter of this patent describes a cutter mechanism mounted externally in conjunction with a toaster. The subject matter of the present invention does not include the use of a cutter mechanism but only includes the use of a holder with the cutting being provided separately.

SUMMARY OF THE INVENTION

In a toaster which has a toaster housing, there is formed a small compartment. Within that small compartment there is to be storable a food cutting holder. The food cutting holder is to be manually extractable from the compartment and locatable on a supporting surface. A food item, such as a bagel, is to be mounted on edge in conjunction with the food cutting holder. One embodiment of the food cutting holder is to include at least one front set of aligned slots which are to function as a guide for a knife blade. Moving of the knife blade through the food item and within the aligned slots results in division of the food item into two equally sized pieces. Another embodiment of the food cutting holder utilizes a platform which has an inner edge pivotly attached to the toaster housing. The inner edge of the platform has mounted thereto a back wall which is mounted substantially at a right angle relative to the platform. Located directly adjacent the outer edge of the platform is a front wall with this front wall being pivotly attached to the platform. This front wall is biased by a spring in a direction toward the back wall. Between the back wall and the front wall is located a confining space. The food item is to be located within the confining space and be clampingly held between the front wall and the back wall. Surfaces of both the front wall and the back wall which are to contact the food item include a holding means in the form of a series of short spikes. When the food cutting holder is in its extended position and a food item is mounted within the confining space, a knife blade can be easily manually moved through the food item without concern for the food item becoming accidently dislodged from the food cutting holder or the user cutting one self. The food cutting holder is to be pivotable into the compartment when it is desired to store the food holder when not in use.

The primary objective of the present invention is to construct a holder for a food item in conjunction with a toaster where the holder will facilitate the cutting of the food item into a plurality of separate pieces.

BRIEF DESCRIPTION OF THE DRAWINGS

FIG. 2 is an isometric view showing the food cutting holder in its extended position available for usage;

FIG. 3 is a cross-sectional view through the first embodiment of the food cutting holder of this invention taken along line 3—3 of FIG. 2;

FIG. 4 is a cross-sectional view through a portion of the first embodiment of the food cutting holder of this invention taken along line 4—4 of FIG. 3;

FIG. 5 is a cross-sectional view through a portion of the food cutting holder of the present invention taken along line 5—5 of FIG. 3;

DETAILED DESCRIPTION OF THE PREFERRED EMBODIMENTS

Figure 1:
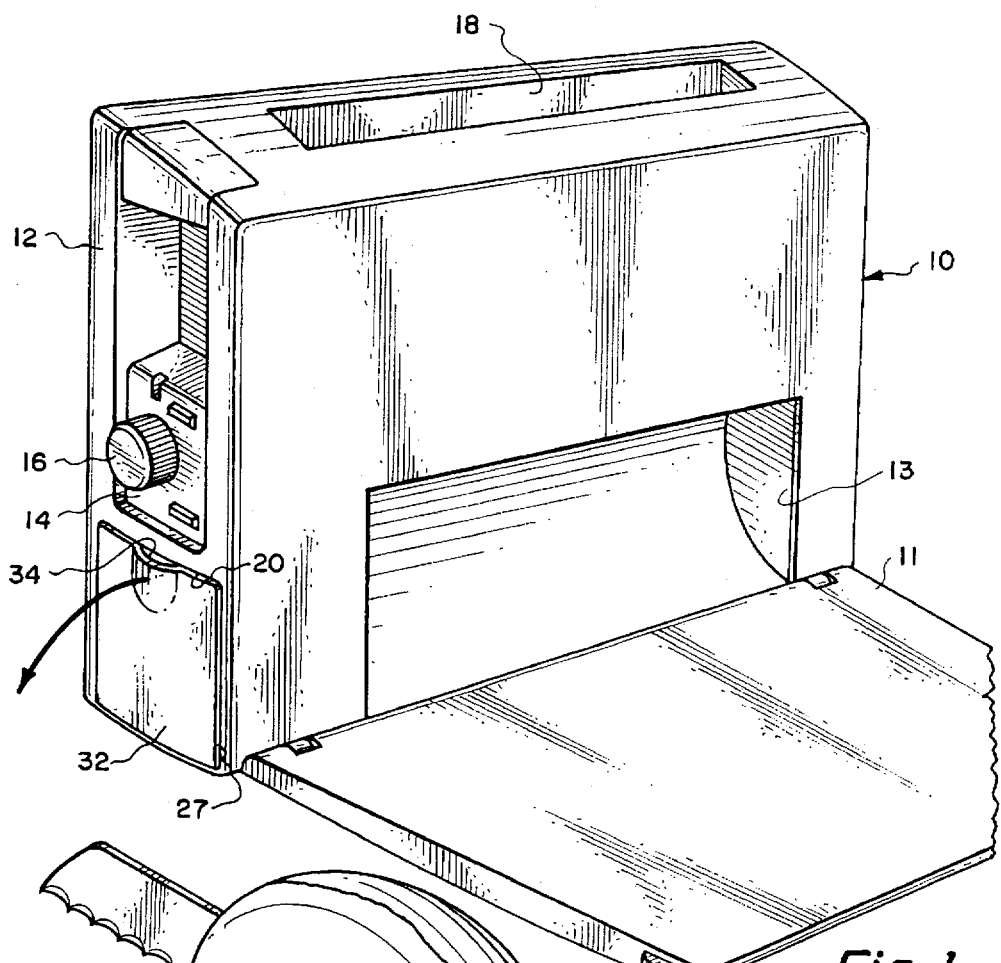
FIG. 1 is an isometric view of a toaster which is constructed to include a first embodiment of food cutting holder of this invention showing the food cutting holder in its storage position.

Referring particularly to the drawings, there is shown in FIG. 1 a toaster 10 which has a toaster housing 12. The toaster housing 12 is basically constructed of sheet material with generally a metal or plastic being preferred. Included within the toaster housing 12 is a control section 14 from which extends a control knob 16. Adjusting of the control knob 16 will vary the length of time of the toasting procedure on the item of food which is deposited within the opening 18 of the toaster 10. The toaster housing 12 also includes a cutting board 11 which is movable from a storage position against the toaster housing 12 to an extended position shown in FIG. 1. When in the extended position, the toasted product from the toaster 10 is ejected from dispensing opening 13 onto cutting board 11.

Formed within the toaster housing 12 is a compartment 20. Integrally formed with the toaster housing 12 and connecting with the compartment 20 is a pair of pins 22 and 24. The pins 22 and 24 are located in a facing aligned relationship. Pin 22 is to be mounted within a hole 26 formed within a side rail 27 of the platform 28. Pin 24 is mounted within a hole 30 formed within an opposite side rail 29 of the platform 28. The platform 28 is pivotable on the pins 22 and 24. Also, the platform 28 is to be easily disengagable from pins 22 and 24 so the platform 28 can be cleaned. Platform 28 is to be quickly reengagable with pins 22 and 24. The platform 28 is movable from the extended position shown in FIGS. 2, 3 and 6 to the storage position shown in FIG. 1. In the storage position shown in FIG. 1, the bottom surface 32 of the platform 28 is located flush with the toaster housing 12. The platform 28 includes a finger access recess 34 which facilitates entry of a finger of a human to then cause pivoting of the platform 28 on the pivot pins 22 and 24. The platform 28 can be pivoted to the extended position which positions the platform 28 at approximately ninety degrees displaced from the position of the platform 28 when in the storage position.

Integrally connected to the inner edge of the platform 28 is a back wall 36. The size of the back wall 36 is to substantially cover the compartment 20 when the platform 28 is in the extended position. The platform 28 includes a mass of short in length spikes 38. The purpose of the spikes 38 will be explained further on in the Specification.

Figure 6:
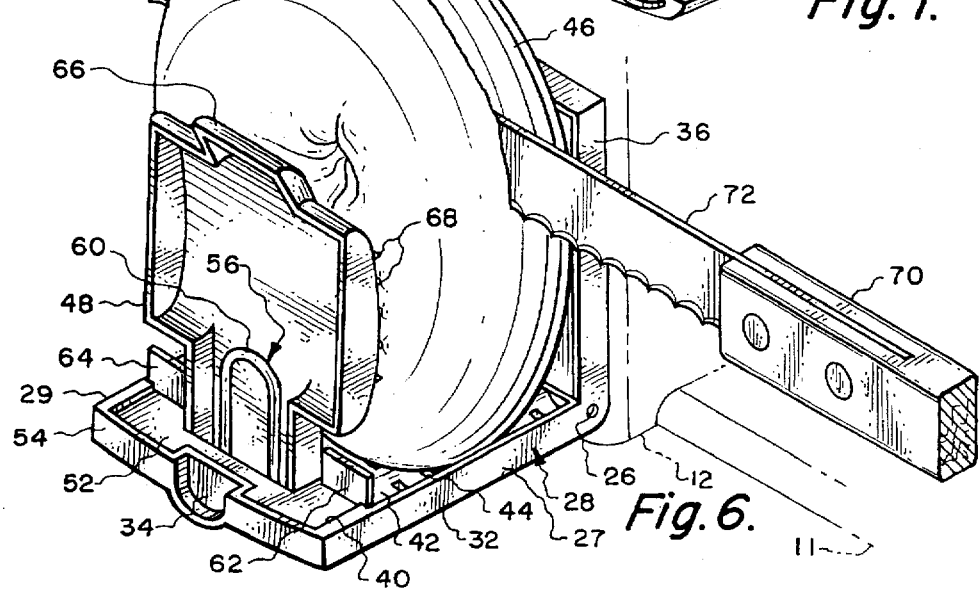
FIG. 6 is an isometric view of the food cutting holder of the present invention showing the food cutting holder in an extended position and being used to divide a food item, such as a bagel, into two separate pieces.

Platform 28 defines an upper recessed surface which in essence forms a chamber 40. Located within the chamber 40 is a tray 42. The tray 42 is deemed to be removable from the chamber 40. The tray 42 covers about three-fourths in size of the chamber 40. The tray 42 includes a mass of holes 44. It is the function of the tray 42 to form a resting surface for the edge of the food item 46 which is shown in FIG. 6 of the drawings to comprise a bagel.

A front wall 48 is pivotly mounted by a rod 50 to the side rails 27 and 29 of the platform 28. In between the side rails 27 and 29 of the platform 28 there is mounted a cover 52 which covers the portion of the chamber 40 located directly adjacent the outer edge of the platform 28 defined by end wall 54. The inner edge of cover 52 includes upstanding tabs 62 and 64. The upstanding tabs 62 and 64 are to confine the crumbs from the food item 46 to the tray 42. The spring 56 defines a pair of coils 57 with these coils 57 being mounted on rod 50. The ends of rod 50 are mounted in holes 51 of blocks 53. There are two blocks 53. Blocks 53 are fixed to platform 28 and located within chamber 40 with one block 53 located directly adjacent side rail 27 and the other block 53 located directly adjacent side rail 29. A leg 58 extends from each coil 57 with there being two such legs 58. A leg 58 is located on each side of the recess 34. The legs 58 will pass through appropriate openings that are formed within the platform 28. These openings are not shown in the drawing. The center part of the spring 56 includes an enlarged loop 60 which abuts against the outside wall surface of the front wall 48. It is the function of the spring 56 to exert a continuous bias against the front wall 48 intending to locate such in a position shown in FIGS. 2 and 3 of the drawings. This bias of the front wall 48 is toward the back wall 36.

The tray 42 can merely fall free of platform 28 when platform 28 is turned upside down. The tray 42 is to be removed from the chamber 40 for the purpose of cleaning to remove food item crumbs that have passed through the holes 44 and are collected within the chamber 40.

The front wall 48 has a handle 66 at its upper edge thereof. It is the purpose of the handle 66 to facilitate moving of the front wall 48 in the direction of arrow 74 against the bias of the spring 56. The inner surface of the front wall 48 includes a mass of short in length spikes 68.

The operation of the first embodiment of food cutting holder which is shown in FIGS. 1-6 of the drawings is as follows: The user places a finger within the recess 34 and pivots the platform 28 to the extended position shown in FIG. 2. The user then places a finger on the handle 66 and pivots the front wall 48 in the direction of arrow 74 against the bias of the spring 56. This enlarges the confining space located between the front wall 48 and the back wall 36. Within this confined space there is to be located the food item 46 with the peripheral edge of the food item 46 being positioned against the tray 42. The user then releases the handle 66 which will cause the spring 56 to pivot the front wall 48 toward the food item 46. There is a small clamping force produced which will cause the spikes 68 and 38 to slightly penetrate the food item 46. These spikes 68 and 38 function as a holding means to hold in position the food item 46 within the food cutting holder of FIGS. 1-6. With the food item 46 now in the clamped position within the food cutting holder, the user can grasp the handle 70 of a knife and pass the knife blade 72 through the food item 46. When the knife blade 72 has passed entirely through the food item 46, the food item 46 will now be divided into two pieces. It is to be understood that the user may, if desired, conduct the knife blade 72 through the food item 46 in two passes to produce three relatively equal sized pieces of the food item 46.

Once the food item 46 is divided as desired and separate pieces are produced, the separate pieces of the food item 46 are to be removed from the confining space once again by placing a finger in conjunction with the handle 66 and pivot the front wall 48 in the direction of arrow 74. This will then permit the different pieces of the food item 46 to be extracted from the food cutting holder. The front wall 28 only needs to be pivoted ninety degrees until the bottom surface 32 comes flush with the toaster housing 12 and at this time the food cutting holder is again relocated in the storage position.

Figure 7:
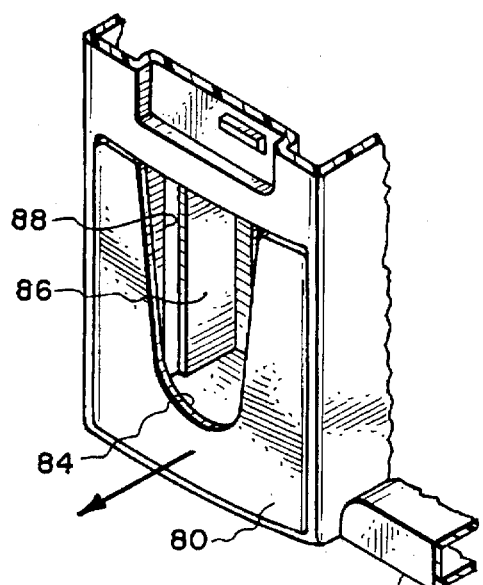
FIG. 7 is an isometric view of the second embodiment of food cutting holder of this invention showing the food cutting holder in its storage position.
Figure 8:
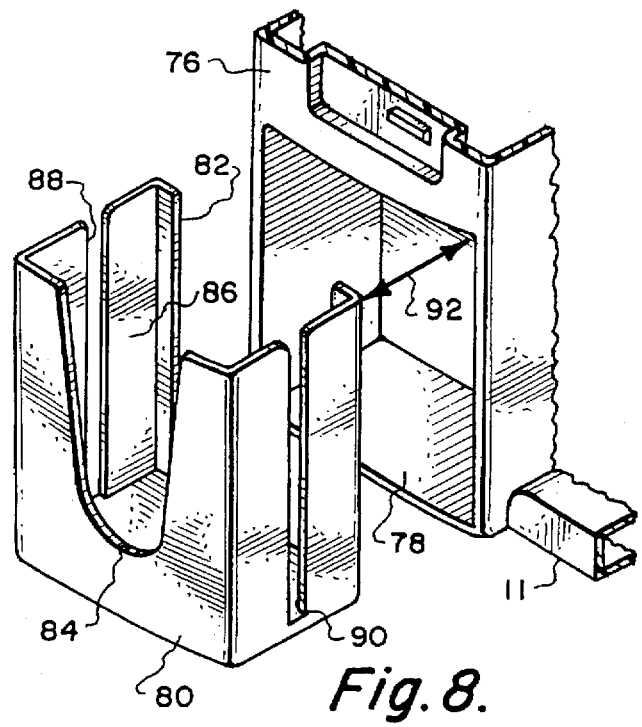
FIG. 8 is an isometric view of the second embodiment of food cutting holder of this invention showing the food cutting holder in its extended position available for usage.
Figure 9:
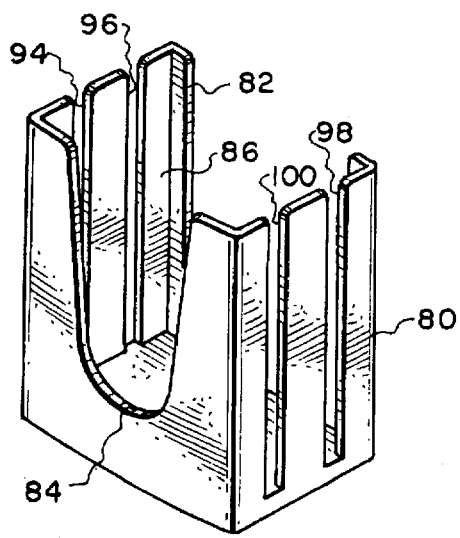
FIG. 9 is an isometric view of a modified form of the second embodiment of food cutting holder of this invention.

Referring particularly to FIGS. 7-9 of the drawings, there is again shown a toaster housing 76 which has a small internal compartment 78. Within the internal compartment 78 there is to be located a food cutting holder housing 80. The food cutting holder housing 80 is constructed basically of sheet material with generally a plastic being preferred. The back wall of the housing 80 defines an enlarged cut-out area 82 with the front wall of the housing 80 including a U-shaped cut-out area 84. The housing 80 has an enlarged internal chamber 86. Arrow 92 indicates the direction of movement of the food cutting holder housing 80 from the internal compartment 78. The purpose of the U-shaped cut-out area 84 is to facilitate manual grasping of the housing 80 to extract such from the internal compartment 78. The food item 46 is to be located within the enlarged internal chamber 86 in the same position as shown in FIG. 6 of the drawings. The one disadvantage of the food cutting holder shown in FIGS. 7-9 versus the food cutting holder shown in FIGS. 1-6 is that the food cutting holder in FIGS. 7-9 is restricted as to the size of the food item 46. The food item 46 has to be of a width no greater than the length of the internal chamber 86.

The food cutting holder shown in FIGS. 7 and 8 includes a pair of aligned slots 88 and 90 formed within respective end walls of the food cutting holder housing 80. It is the function of the aligned slots 88 and 90 to provide access for a knife blade (not shown) which is to be conducted through the food item 46 resulting in division of the food item 46 into two equal parts. After the food item 46 has been divided into two equal parts, the food cutting holder 80 is to be reinserted into the internal compartment 78 as depicted by the direction of arrow 92. Relocating of the housing 80 back into the internal compartment 78 can merely be accomplished by physically grabbing of the end walls of the housing 80 in a pincher type of action and then inserting the housing 80 into the internal compartment 78.

Referring particularly to FIG. 9 of the drawings, the end walls of the food cutting holder housing 80 defines elongated slots 94, 96, 98 and 100. The elongated slots 96 and 98 are aligned and slots 94 and 100 are aligned. The knife blade, which is again not shown, is to be conducted through the elongated slots 96 and 98 and then conducted through the elongated slots 94 and 100. The result will be the division of food item 46 into three substantially equal parts.

What is claimed is:

1. In combination with a toaster, said toaster having a toaster housing, a holder for an item of food comprising:

a food cutting holder housing having an internal chamber, said internal chamber adapted to receive an item of food and support the item of food in a fixed relationship, said food cutting holder housing have at least one pair of aligned slots, said aligned slots to guide a knife blade as the knife blade passes through the food item to achieve division of the food item into separate pieces; and a storage compartment mounted within said toaster housing, said food cutting holder housing to be locatable in said storage compartment when not being used, said food cutting holder housing being removable from said storage compartment when being used.

2. The combination as defined in claim 1 wherein:

said food cutting holder housing including a second pair of aligned slots, whereby the food item that is supported within said food cutting holder housing is to be divided into three separate pieces by conducting of a knife blade through the food item and through each said pair of aligned slots.

3. In combination with a toaster, said toaster having a toaster housing, a holder for an item of food comprising:

a storage compartment formed within said toaster housing;

a platform having an inner edge and an outer edge, said inner edge being pivotly mounted to said toaster housing, said platform being pivotly movable from a storage position located within said storage compartment to an extended position located exteriorly of said storage compartment;

a back wall attached to said platform, said back wall extending from said platform substantially at a right angle, said back wall locatable substantially flush with said toaster housing when said platform is in said extended position, said back wall located within said storage compartment when said platform is located in said storage position; and a front wall mounted on said platform directly adjacent said outer edge, said front wall extending from said platform with there being a confining space located between said front wall and said back wall, said front wall being movable a limited distance relative to said platform, whereby a food item is to be located within said confining space and on said platform and clampingly held in position between said back wall and said front wall permitting a knife blade to pass through the food item to achieve division of the food item into separate pieces.

4. The combination as defined in claim 3 wherein:

said platform including a tray, said tray being removable from said platform for the purpose of cleaning.

5. The combination as defined in claim 4 wherein:

said tray including a plurality of holes, said holes to facilitate the passing of crumbs from said item of food to be collected by said platform.

6. The combination as defined in claim 3 wherein:

said back wall including a first holding means, said first holding means being for the purpose of holding for cutting and preventing accidental dislodgment of said item of food when located within said confining space.

7. The combination as defined in claim 6 wherein:

said first holding means comprising a mass of short spikes, said spikes are to slightly penetrate said item of food.

8. The combination as defined in claim 6 wherein:

said front wall including second holding means, said second holding means being for the same purpose as said first holding means.

9. The combination as defined in claim 8 wherein:

said second holding means comprising a mass of short spikes, said spikes being adapted to penetrate said item of food.

10. The combination as defined in claim 3 wherein:

said front wall being spring biased by a spring toward said back wall, whereby upon said item of food being located within said confining space said spring causing a clamping action of said front wall against said item of food.

* * * * *